United States Patent
Gilkerson et al.

(10) Patent No.: US 7,140,784 B2
(45) Date of Patent: Nov. 28, 2006

(54) ROSA ALIGNMENT USING DC OR LOW FREQUENCY OPTICAL SOURCE

(75) Inventors: Jack A. Gilkerson, Wylie, TX (US); Jimmy A. Tatum, Plano, TX (US); André Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 58 days.

(21) Appl. No.: 11/092,443

(22) Filed: Mar. 29, 2005

(65) Prior Publication Data
US 2006/0228077 A1    Oct. 12, 2006

Related U.S. Application Data

(60) Provisional application No. 60/606,096, filed on Aug. 31, 2004.

(51) Int. Cl.
*G02B 6/36* (2006.01)
(52) U.S. Cl. .............................. 385/91; 385/90; 385/92
(58) Field of Classification Search ............ 385/90–92; 438/55
See application file for complete search history.

(56) References Cited

U.S. PATENT DOCUMENTS

| | | | | |
|---|---|---|---|---|
| 6,265,240 | B1 * | 7/2001 | Dautartas et al. | 438/55 |
| 6,325,551 | B1 * | 12/2001 | Williamson, III et al. | 385/88 |
| 6,861,641 | B1 * | 3/2005 | Adams | 250/239 |
| 2005/0023434 | A1 * | 2/2005 | Yacoubian | 250/200 |
| 2005/0163439 | A1 * | 7/2005 | Vanniasinkam et al. | 385/93 |

\* cited by examiner

*Primary Examiner*—Michelle Connelly-Cushwa
*Assistant Examiner*—Chris H. Chu
(74) *Attorney, Agent, or Firm*—Workman Nydegger

(57) ABSTRACT

Methods and apparatus for alignment of TO cans with photodiodes on fiber-optic receptacles. The methods and apparatus make use of direct connections to photodiodes or connections to Received Signal Strength Indicator (RSSI) outputs to align TO cans in fiber-optic receptacles. An optical source, such as a laser diode, can be powered by a low-frequency or DC source. This optical source can direct light into the fiber-optic receptacle. The TO can is manipulated in a barrel of the fiber-optic receptacle. The current through the photodiode or the RSSI output is monitored to determine when light directed into the photodiode is at a maximum or above a predetermined threshold. The TO can is fixed in the barrel when the light directed into the photodiode is at the maximum or predetermined threshold.

13 Claims, 1 Drawing Sheet

ROSA ALIGNMENT USING DC OR LOW FREQUENCY OPTICAL SOURCE

CROSS-REFERENCE TO RELATED APPLICATIONS

This application claims the benefit of U.S. Provisional Application No. 60/606,096, titled ROSA ALIGNMENT USING DC OR LOW FREQUENCY OPTICAL SOURCE filed Aug. 31, 2004, which is incorporated herein by reference.

BACKGROUND OF THE INVENTION

1. The Field of the Invention

The invention generally relates to aligning optical components. More specifically, the invention relates to aligning a TO can, including a photodiode, in a receptacle.

2. Description of the Related Art

Fiber-optic communication is used to transmit digital signals. The signals are converted to and from light signals which are then transmitted and received along fiber-optic cables. The fiber-optic cables are generally glass and/or plastic waveguides that allow for the propagation of optical signals along the fiber-optic cables.

A light emitting diode (LED) or laser is often used to convert the digital signal to an optical signal. The LED or laser is often included in an optical component known as a transmitting optical subassembly (TOSA). The TOSA modulates the laser according to a digital electronic stream received at the TOSA to produce a modulated optical signal. This modulated optical signal is sent along a fiber-optic cable to a receiver optical subassembly (ROSA).

A ROSA generally includes a photodiode or other light-sensitive device connected to a transimpedance amplifier (TIA). Light from the optical signal impinging the photodiode causes a current to pass through the photodiode where the current corresponds to the amount of light impinging the photodiode. The TIA converts the current running through the photodiode to an electronic signal usable by a digital device such as a computer, network router and the like.

It is desirable to manufacture TOSAs and ROSAs such that they can be implemented quickly and efficiently in an optical network. Thus, the TOSA and ROSA often include fixed receptacles, such as LC, SC and the like, that allow the fiber-optic cables to be plugged into the receptacle such that the fiber-optic cables are properly aligned for receiving and delivering optical signals.

In the example of a ROSA, the photodiode is often encapsulated in a transistor outline (TO) can where the TO can also encapsulates supporting circuitry for the photodiode such as the TIA. The TO can often includes a transparent top surface for receiving optical signals at the photodiode. To couple a receptacle to the TO can, a high frequency optical signal is directed into the receptacle while the TO can is manipulated in the barrel of the receptacle until the highest amount of coupling of the optical signal into the photodiode occurs. The TO can may then be epoxied or otherwise fixed in the barrel of the receptacle such that it is in an optimum position for receiving optical signals.

The ROSA may be designed to receive optical signals that are in the 1 gigabit per second and higher range. Alignment techniques have typically used a 1 gigabit per second or higher signal directed into the photodiode to align the TO can in the barrel for maximum optical coupling. Unfortunately, expensive test equipment must be used to monitor the signal in the ROSA for determining when the maximum optical coupling occurs because of the high frequencies used when aligning.

What would be useful is test equipment that can test ROSA alignment using lower frequency or DC optical signals.

BRIEF SUMMARY OF THE INVENTION

Embodiments are directed towards aligning TO cans in receptacles. The TO cans may include a photodiode. The embodiments allow low frequency or DC optical signals to be used to align the TO cans in the receptacles. Current is monitored through the photodiode, or alternatively a Received Signal Strength Indicator (RSSI) output of a transimpedance amplifier is monitored to determine when a photodiode in a TO can is receiving a maximum amount of optical power.

For example, in one embodiment, a method of aligning a TO can in a receptacle is described. The receptacle includes a fiber receptacle for receiving a fiber and a barrel for receiving a TO can. The TO can includes a photodiode connected to a transimpedance amplifier. The photodiode has a node that is accessible external to the TO can. The method includes connecting the photodiode to a source external to the TO can. The transimpedance amplifier is connected to a source. A low frequency beam is directed into the fiber receptacle. The TO can is manipulated in the barrel. Current through the photodiode is monitored as the TO can is manipulated. The TO can is fixed in the barrel in a position where current through the photodiode is at a maximum or at a predetermined threshold.

In another embodiment, a method of aligning a TO can is performed on a TO can with a photodiode and transimpedance amplifier, where the transimpedance amplifier includes an RSSI output. The TO can is aligned in a receptacle that includes a fiber receptacle for receiving a fiber and a barrel for receiving the TO can. The method includes connecting the transimpedance amplifier to a source. A low frequency beam is directed into the fiber receptacle. The TO can is selectively manipulated in the barrel. The RSSI output is monitored as the TO can is selectively manipulated. The TO can is fixed in the barrel in a position where the RSSI output is at a maximum or at a predetermined threshold.

One embodiment is directed towards an alignment apparatus. The alignment apparatus includes an optical power source. The optical power source is able to be connected to a fiber receptacle. A low frequency supply is connected to the optical power source. A first external supply is able to connect to a transimpedance amplifier in a TO can. Such a transimpedance amplifier is typically connected to a photodiode. A second external supply is able to connect to the photodiode for supplying current to the photodiode. An amplifier is able to connect to the photodiode. The amplifier outputs a signal proportional to current through the photodiode. A test fixture is connected to the amplifier. The test fixture is able to monitor the signal proportional to current through the photodiode. The test fixture includes an indicator that indicates when the photodiode in the TO can has a maximum current or predetermined threshold of current passing through the photodiode.

Another alignment apparatus includes an optical power source that can be connected to a fiber receptacle. The optical power source is connected to a low frequency supply. An external supply is able to connect to a transimpedance amplifier. The transimpedance amplifier may be disposed in a TO can and connected to a photodiode that is also disposed in the TO can. A test fixture is able to connect to an RSSI output of the transimpedance amplifier. The test fixture is configured to monitor the RSSI output. The test fixture includes an indicator that is able to indicate when the RSSI output is at a maximum or a predetermined threshold.

Advantageously, the embodiments described above facilitate alignment of TO cans with photodiodes in receptacles without using high frequency signals for which the TO cans are typically used with. This allows for less expensive equipment to be used in the alignment process.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Some embodiments of the present invention make use of direct access to photodiodes in ROSAs or access to a Received Signal Strength Indicator (RSSI) output from a transimpedance amplifier (TIA). With direct access to the photodiode or access to the RSSI output from the transimpedance amplifier, low frequency currents and voltages including DC currents and voltages, can be used to align a TO can in a receptacle.

Figure 1:
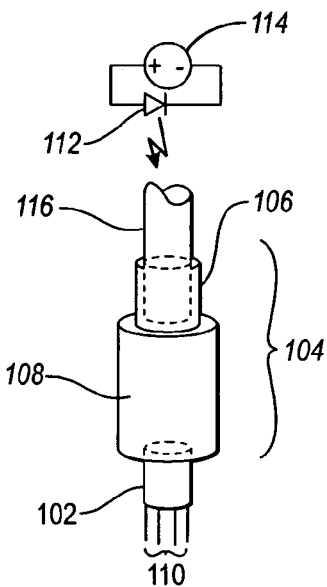
FIG. 1 illustrates a TO can being aligned in an LC receptacle.

Referring now to FIG. 1, an example of a method for aligning a TO can 102 that includes a photodiode and transimpedance amplifier, in an LC receptacle 104 is shown. The LC receptacle 104 includes a fiber receptacle 106 and a barrel 108. The fiber receptacle 106 is adapted to receive a fiber-optic cable for transmitting optical signals into the LC receptacle 104. The barrel 108 is adapted to receive a TO can 102. Optimally, the TO can 102 is aligned in the barrel 108 such that maximum coupling of an optical signal received from a fiber-optic cable in the fiber receptacle 106 is achieved in the photodiode in the TO can 102.

One embodiment allows an optical source 112 powered by a DC supply 114 to transmit an optical beam through a fiber 116 in the fiber receptacle 106 into the barrel 108, further into the TO can 102 where the optical beam may be received by a photodiode in the TO can 102. An external pin 110 that is connected to circuitry within the TO can 102 is connected to the photodiode or to an RSSI output of a TIA. This allows circuitry external to the TO can 102 to monitor the amount of optical power received by the photodiode in the TO can 102. Thus, in one embodiment, a method is used whereby the TO can 102 is manipulated in the barrel 108 while a DC powered optical source beam is fed into the fiber receptacle 106. When measurements at the external pin 110 indicate that coupling of the optical source beam is at a maximum or above a predetermined threshold, the TO can 102 may be fixed in the barrel 108 in the position where maximum coupling or the predetermined threshold was reached.

Figure 2:
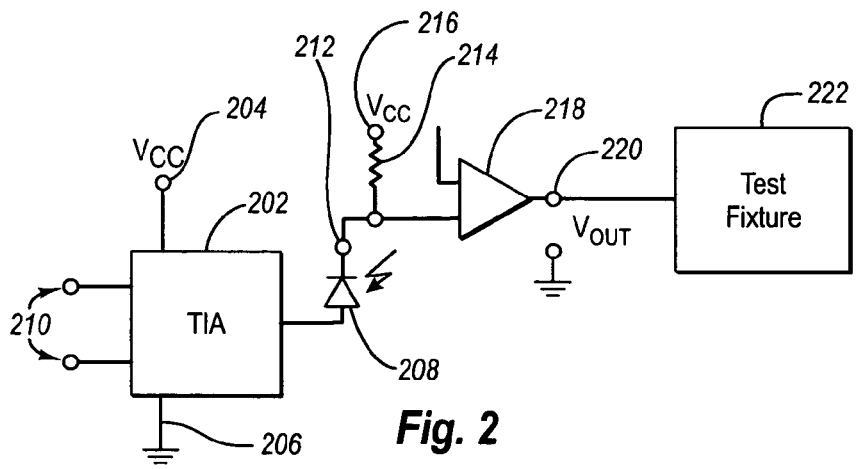
FIG. 2 illustrates a schematic representation of a circuit used for aligning a TO can in a receptacle.

Referring now FIG. 2, a schematic diagram of circuitry used in implementing the method described in FIG. 1 shown. FIG. 2 illustrates a TIA 202 TIA 202 includes a supply node 204 that is adapted to be connected to an external power supply. The TIA 202 further includes a ground connection 206. The TIA 202 is connected to a photodiode 208. When light impinges the photodiode 208, the TIA 202 produces an electrical signal at the differential output nodes 210.

In the example shown, the photodiode 208 is connected to an external photodiode node 212. In the present example, an external supply 216 may be connected to a current sensing resistor 214 which is in turn connected to the photodiode 208. A voltage produced at the external photodiode node 212 is produced when current flows through the current sensing resistor 214 and the photodiode 208. Using Ohms law, the amount of current passing through the resistor 214 and photodiode 208 can be calculated from the value of the resistor 214 and the difference in voltages at the external supply 216 and the external photodiode node 212. The voltage produced at the external photodiode node 212 may be fed into a high precision amplifier 218. In one embodiment, the amplifier 218 is a high gain high precision amplifier. Further, high precision resistors or other components may be used to appropriately bias the amplifier 218. Amplifier 218 is designed to output a particular voltage at an output node 220 where the particular voltage is dependent on the amount of current running through the resistor 214 and photodiode 208. In one example, the output of the amplifier 218 may be designed to produce an output voltage in the range of 0 to 10 V. The range may be dependent on other equipment that will use the output voltage. For example, as shown in FIG. 2 the output voltage node 220 is connected to a test fixture 222. The test fixture 222 may include circuitry that requires input voltages to be within a certain range. Thus the output of the amplifier 218 can be designed to appropriately match the input requirements of the test fixture 222. Thus, the output voltage, in one embodiment, may be 0.5 V at dark current (i.e. the current running through the photodiode 208 when no light is impinging the photodiode 208) and 10 V at the highest expected current through the photodiode 208.

The test fixture 222 may include an indicator that indicates the amount of coupling of light to the photodiode 208. Using this indicator, it can be determined when the maximum amount of coupling occurs or when the predetermined threshold of light is coupled into the photodiode 208. Thus, the indicator may be used to determine when a TO can 102 (FIG. 1) should be secured in place in the barrel 108 (FIG. 1) of an LC receptacle 104 (FIG. 1). The indicator as used herein may be embodied in several different forms. For example, the indicator may be an indicator such as an analog or digital meter output. Alternatively, various alarms, whether audio, visual, or otherwise may be used. Further, in some embodiments, the indicator may be a digital or analog signal that may be received by a computer or other electronic circuit.

This process may be automated or performed manually. For example, the test fixture 222 may include computer controlled robotics to adjust the TO can 102 (FIG. 1) and to secure the TO can 102 (FIG. 1) in the barrel 108 (FIG. 1) when maximum or a sufficient amount of coupling occurs.

Figure 3:
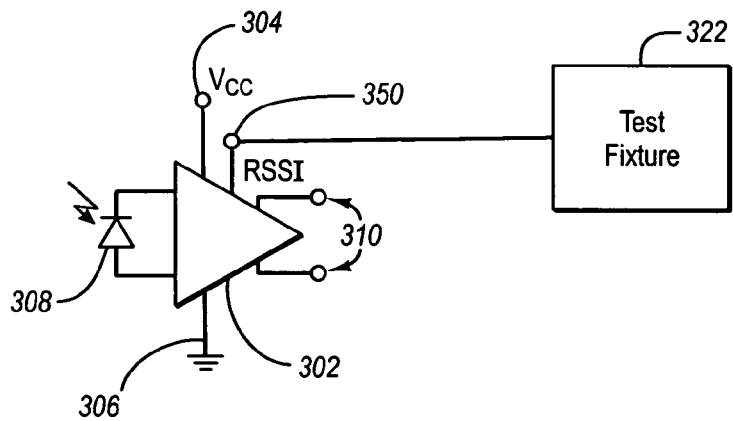
FIG. 3 illustrates a schematic representation of an alternate circuit used for aligning a TO can in a receptacle.

Referring now FIG. 3, an alternate embodiment is shown where a TIA 302 is connected to a test fixture 322 by an RSSI output 350. Ordinarily, the RSSI output 350 in a TIA 302 is used to determine the average power received at the TIA 302. However, using principles of embodiments of the present invention, the RSSI output 350 can be used to detect a DC powered light source directing optical energy into a photodiode 308. When light impinging the photodiode 308 is at a maximum or above a predetermined threshold as a result of manipulating a TO can 102 (FIG. 1) in a barrel 108 (FIG. 1) of an LC receptacle 104 (FIG. 1), the output at the RSSI output 350 may be used to so indicate such as when that output is fed into a test fixture 322. As with the example shown in FIG. 2, the TIA 302 includes a differential output 310, a supply node 304, and a ground connection 306.

While embodiments of the present invention indicate that a DC powered optical source is used to align a TO can in the barrel of an LC receptacle, other embodiments of the invention may allow for the use of other signals. For example, an optical signal at a lower frequency than the signals typically used in ROSAs (i.e. one gigabit per second and above) may be used to align the TO can in the barrel of a receptacle. This would still allow the alignment be done without using expensive test equipment that is commonly used when higher frequency optical sources are used to direct optical energy into a photodiode.

While the embodiments described herein have made reference to LC receptacles, other receptacles, such as SC and others, may be used as well. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of aligning a TO can in a receptacle, wherein the receptacle comprises a fiber receptacle for receiving a fiber and a barrel for receiving a TO can, wherein the TO can comprises a photodiode coupled to a transimpedance amplifier, the photodiode having a node accessible external to the TO can, the method comprising:
   connecting the photodiode node to a source external to the TO can;
   connecting the transimpedance amplifier to a source;
   directing an low frequency beam into the fiber receptacle;
   selectively manipulating the TO can in the barrel;
   monitoring current through the photodiode as the TO can is selectively manipulated in the barrel; and
   fixing the TO can in the barrel in a position where the current through the photodiode is at a maximum or at a predetermined threshold.

2. The method of claim 1, wherein connecting the photodiode node to a source external to the TO can comprises connecting the photodiode node to the source external to the TO can through a current sensing resistor and wherein monitoring current through the photodiode comprises monitoring a voltage across the current sensing resistor.

3. The method of claim 1, wherein directing a low frequency beam into the fiber receptacle comprises directing a DC beam into the fiber receptacle.

4. The method of claim 1, wherein monitoring current through the photodiode comprises feeding a signal into an amplifier and producing a voltage.

5. The method of claim 4, wherein producing a voltage comprises producing a voltage in a range suitable for equipment that will use the voltage.

6. The method of claim 5, wherein the voltage is in a range of 0 to 10 V.

7. An alignment apparatus comprising:
   an optical power source adapted to be coupled to a fiber receptacle, wherein the optical power source is coupled to a low frequency supply;
   a first external supply adapted to connect to a transimpedance amplifier, wherein the transimpedance amplifier is disposed in a TO can and coupled to a photodiode disposed in the TO can;
   a second external supply adapted to connect to the photodiode for supplying current to the photodiode;
   an amplifier adapted to couple to the photodiode, the amplifier being configured to output a signal proportional to the current through the photodiode;
   a test fixture coupled to the amplifier, the test fixture configured to monitor the signal proportional to current through the photodiode, the test fixture comprising an indicator that is adapted to indicate when the photodiode in the TO can has a maximum current or a predetermined threshold of current passing through the photodiode.

8. The alignment apparatus of claim 7, wherein the first and second external supplies are comprised of a single power supply adapted to be connected to both the transimpedance amplifier and the photodiode.

9. The alignment apparatus of claim 7, further comprising a current sensing resistor coupled to the amplifier and the second external supply and adapted to couple to the photodiode.

10. The alignment apparatus of claim 7, further wherein the test fixture comprises computer controlled robotics adapted to couple to the TO can, the computer controlled robotics being configured to adjust the TO can and to secure the TO can in a barrel when the indictor indicates that the photodiode has a maximum current or a predetermined threshold of current passing through it.

11. The alignment apparatus of claim 7, wherein the low frequency supply is a DC supply.

12. The alignment apparatus of claim 7, wherein the indicator comprises a digital or analog signal.

13. The alignment apparatus of claim 7, wherein the indicator comprises a meter.

* * * * *

UNITED STATES PATENT AND TRADEMARK OFFICE
CERTIFICATE OF CORRECTION

PATENT NO.         : 7,140,784 B2  
APPLICATION NO. : 11/092443  
DATED                  : November 28, 2006  
INVENTOR(S)        : Gilkerson et al.

Page 1 of 1

It is certified that error appears in the above-identified patent and that said Letters Patent is hereby corrected as shown below:

Column 4
Line 12, change "TIA 202 TIA 202 includes" to --TIA 202, including--

Column 6
Line 46, before "wherein", remove [further]

Signed and Sealed this

Seventeenth Day of June, 2008

JON W. DUDAS
*Director of the United States Patent and Trademark Office*